Oct. 15, 1929. H. S. POWELL 1,731,541
WELDING MACHINE
Filed July 28, 1927 2 Sheets-Sheet 1
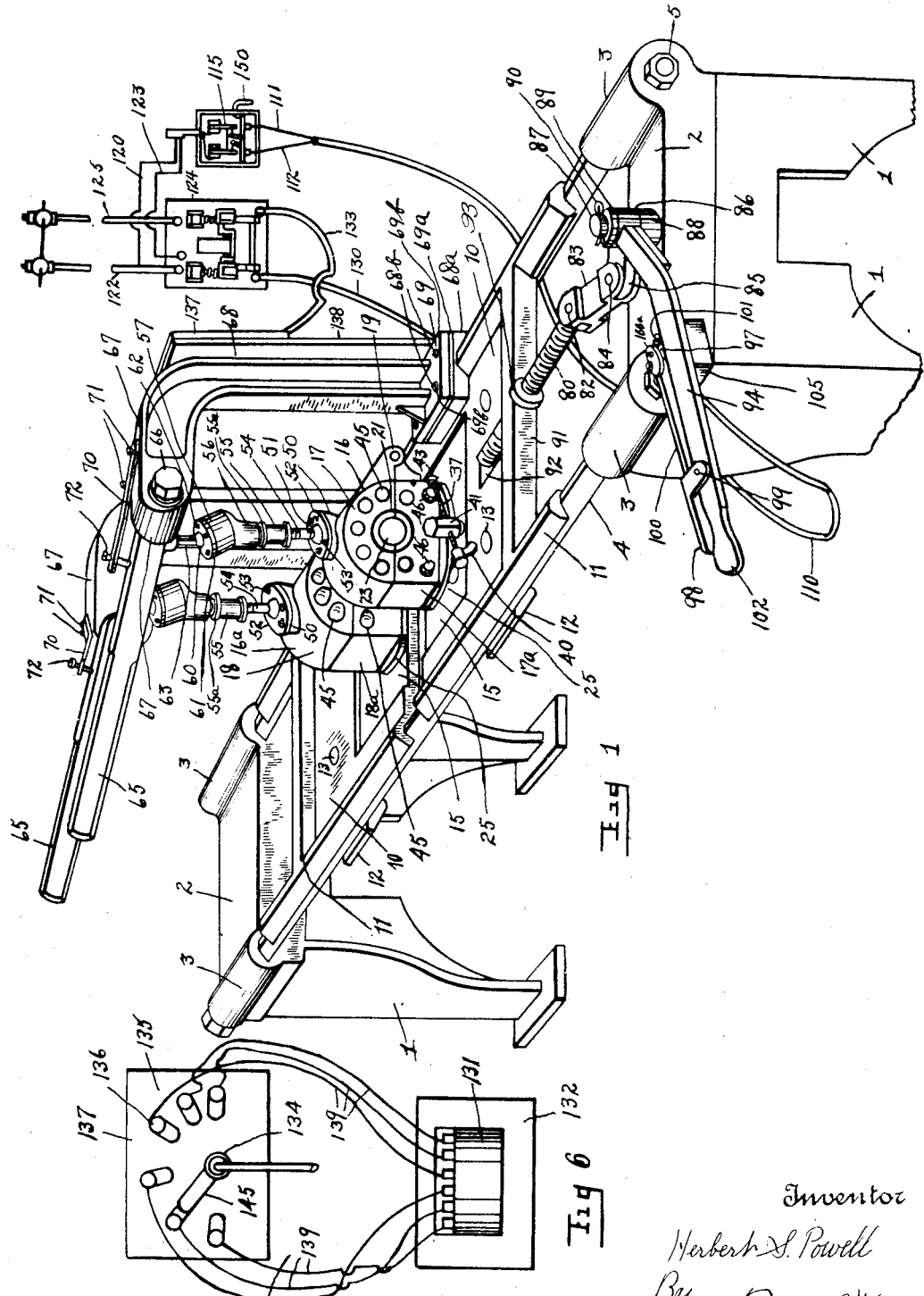
Inventor
Herbert S. Powell
By Thomas L. Wilder
Attorney

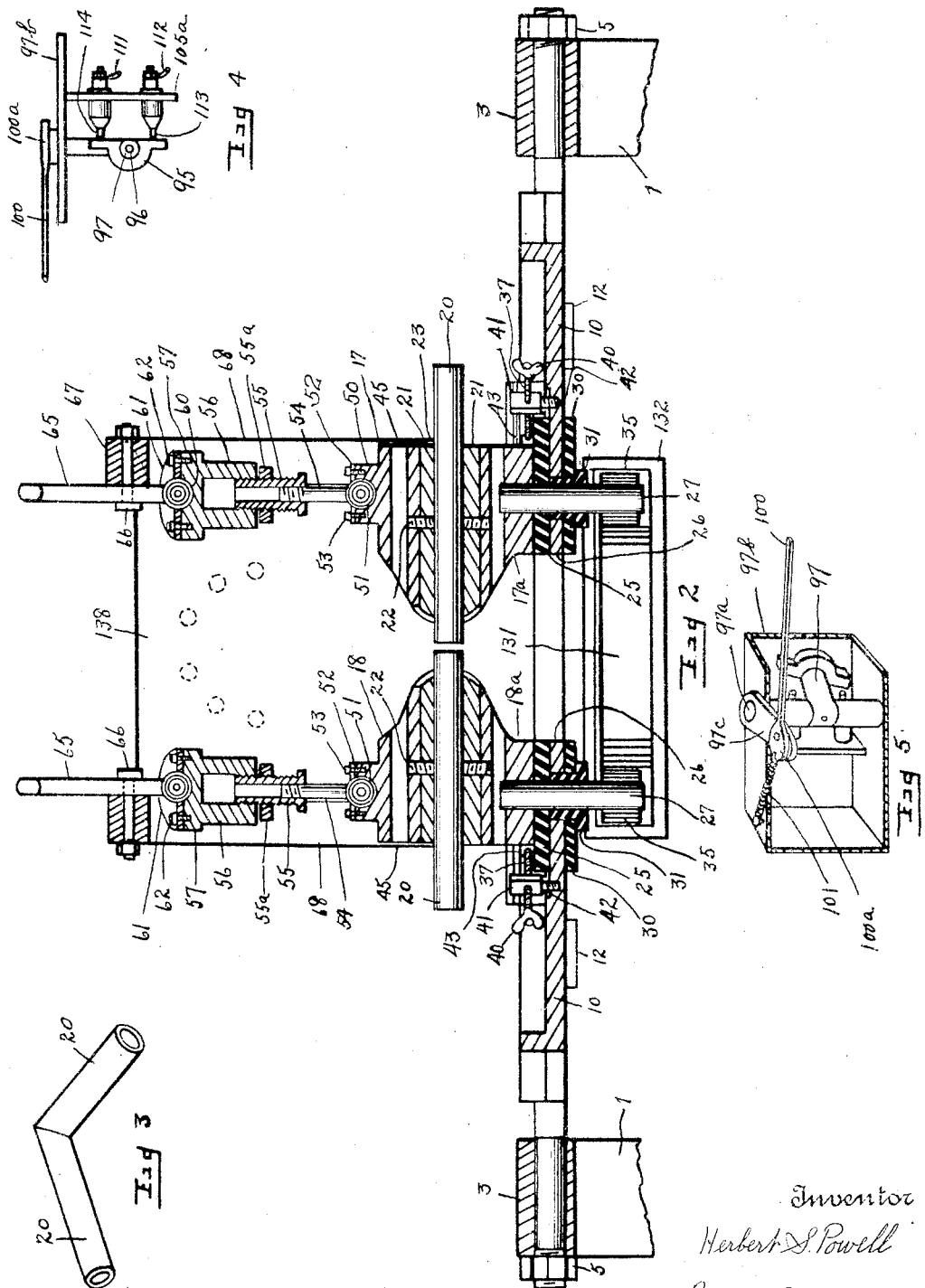

UNITED STATES PATENT OFFICE

HERBERT S. POWELL, OF UTICA, NEW YORK

WELDING MACHINE

Application filed July 28, 1927. Serial No. 209,100.

My invention relates to a welding machine and I declare the following to be a clear, concise, full and exact description thereof sufficient to enable anyone skilled in the art to which it appertains to make and use the same, reference being had to the accompanying drawings in which like reference characters refer to like parts throughout the specifications.

The object of the invention is to provide a machine for welding together pieces of tubing. The machine is adapted to weld the ends of the tubing either with the tubes in prolongation of each other or at an angle, whereby to form straight tubing of any predetermined length or tubing with angles therein to suit the convenience of the user thereof.

The object will appear by referring to the drawings in which:

Fig. 1 is a perspective view of the machine.

Fig. 2 is a central longitudinal section of Fig. 1.

Fig. 3 is a detail view showing tubing after welded together by the machine.

Fig. 4 is a detail view showing in elevation the parts of a switch employed.

Fig. 5 is a detail perspective view showing a perspective of the switch in Fig. 4.

Fig. 6 is a detail view showing in elevation a rheostat and transformer employed.

Referring more particularly to the drawings, the device embodies a frame comprising end standards 1, 1 having top surfaces 2, 2 and socket members 3, 3 in each instance. Side bars 4, 4 rounded off at their ends are supported within socket members 3. The extreme ends thereof are threaded for the mounting of nuts 5, 5 in each instance, whereby to hold side bars 4, 4 in place.

Side bars 4 are in the shape of a truncated triangle in cross section and support the adjustable plates 10, 10. Plates 10 are equipped in each instance with members 11, 11 having grooves corresponding in shape to that of bars 4, whereby they will rest thereon and be permitted to slide therealong. Clamping members 12, 12 are in each instance attached to the under surface of plates 10, 10 by bolts 13, 13.

Each of the plates 10 is countersunk slightly at 15 for the disposition of a rotatable tube holding member 16, 16ª. Each of the tube holding members 16, 16ª is made in two parts, 17, 17ª and 18, 18ª respectively that are hinged together as 19, 19 whereby the upper parts 17, 18 can be swung off the lower parts 17ª, 18ª respectively at the will of the user and thereby give access to the hollow interior for the disposition of tubes 20. Die bushings, 21, 21 are disposed in the hollow interior of members 16, 16ª and are held in place by screw bolts 22, 22. Die bushings 21, 21 are split in halves to give access to the interior thereof provided with a cylindrical recess 23 for the disposition of said tube 20 to be welded. Recess 23 is open at both ends, whereby tube 20 can extend beyond the side surfaces of members 16, 16ª.

Each of the members 16, 16ª rests upon a circular disk 25 made of hardened rubber or other insulated material. The edge of disk 25 is cut off to fit flush with the inner end edge 26 of plate 10.

The means for permitting each of members 16, 16ª to rotate embodies shafts 27 projecting upward through plates 10 into the lower half 17ª and 18ª respectively of holding members 16, 16ª. Said shafts 27 are fixed to turn with said members 16, 16ª respectively. In order to insulate shafts 27 from plates 10 a hardened rubber disk 30 is disposed underneath plate 10 to parallel hardened rubber disk 25 above. A hardened rubber headed sleeve 31 surrounds each of said shafts 27 through plate 10.

A laminated electrical terminal 35 is clamped about the lower end of shafts 27, whereby to supply an electric current to members 16, 16ª for forming the electric weld, as hereinafter explained.

The means to aid in turning each of members 16, 16ª embodies a screw threaded shaft 37 equipped with a winged head 40. Shaft 37 is mounted to a threaded aperture in block 41 that is in turn reduced and threaded at 42 to a threaded aperture in plate 10. The free end of shaft 37 rests against a shoulder 43 formed integral with lower half of each of members 16, 16ª. The turning of shafts 37 by aid of winged heads 40 will rotate members 16, 16ᵃ whereby to effect the proper angle at which tubes 20 are to be welded. Open holes 45 are made through both lower 18, 18ᵃ and upper 17, 17ᵃ halves of members 16, 16ᵃ for the circulation of air to aid in cooling said parts. Other holes closed by screw caps 46 are made in members 16, 16ᵃ to hold water for cooling purposes.

The means for raising upper half 17, 17ᵃ off from lower half 18, 18ᵃ of holding members 16, 16ᵃ whereby to place tubes 20 herein, contemplates a bushing 50 formed integral with each upper half 17, 17ᵃ of members 16, 16ᵃ. Bushing 50 has a spherical socket for the reception of spherical member or ball 51. A plate 52 having a recess for the projection of the upper portion of ball 51 is bolted at 53 to bushing 50, whereby to hold ball 51 in place. A threaded shaft 54 is formed integral with ball 51. The upper end of shaft 54 has a threaded connection to sleeve 55, which in turn has an internal threaded connection to the lower threaded end 56 of upper socket member 57. Annular lock nuts 55ᵃ are mounted on sleeves 55 to hold the same in given relation to socket member 57. The interposition of sleeve 55 will allow for vertical adjustment of upper socket member 57. Upper socket member 57 has a spherical recess for the reception of sphere or ball 60 that is held by plate 61 bolted at 62 to socket member 57. A shaft 63 is formed integral with ball 60 and with handle lever 65. Handle lever 65 is fulcrumed upon bolt 66 carried in the horizontal part 67 of upstanding bracket 68. Each of brackets 68 is made integral with a plate 69 which is bolted to member 68ᵃ by bolts 68ᵇ. Member 68ᵃ is made integral with plate 10 and is separated from plate 69 by a hardened rubber, fabric or other insulated material 69ᵃ. Likewise bolts 68ᵇ are surrounded by insulated material 69ᵇ whereby to completely insulate plates 69 and brackets 68 from plate 10. An arm 70 is bolted at 71, 71 to the upper horizontal part 67 of bracket 68. Its free end is bent upwards and carries in a threaded aperture an adjustable bolt 72. The lower end of bolt 72 limits the upward movement of handle lever 65.

The means for moving member 16 towards and away from the other member 16ᵃ embodies a screw bolt 80. One end of bolt 80 is pivoted at 82 to link 83 that is in turn pivoted at 84 to arm 85 formed integral with sleeve 86 mounted to turn on heated shaft 87. Sleeve 86 is held between collars 88 and 89. A cotter pin 90 is inserted through a hole in the end of shaft 87 to hold sleeve 86 and collars 88 and 89 in position. The opposite end of bolt 80 has a threaded mounting in the end surface 91 of plate 10, which is recessed at 92 to provide clearance for bolt 80. Lock washer 93 is screw mounted to screw bolt 80 and is turned against the end surface 91 of plate 10, whereby to lock bolt 80 in predetermined position.

A lever arm 94 is made integral with collar 86. An electric switch 95 is pivoted at 96 to shaft 97 fastened to turn with shaft 97ᵃ that is carried in bearings in box 97ᵇ. Box 97ᵇ is secured to the underside of lever arm 94. The upper end of shaft 97ᵃ projects through the upper surface of box 97ᵇ. An arm 97ᶜ is fixed to said upper end of shaft 97ᵃ, whereby to turn said shaft 97ᵃ when said arm is rocked. Arm 97ᶜ is rocked whereby to actuate switch 95 by a handle 98 pivoted at 99 to arm 94. It is connected to arm 97ᶜ by connecting rod 100, whereby said switch can be closed simultaneously with the rocking of arm 94 that moves plate 10. A coiled spring 101 connected at one end to the enlarged part 100ᵃ of rod 100 and at the other to box 97ᵇ will return switch 95 to open position automatically upon releasing handle 98. The electric terminals 113, 114 of switch 95 are attached to the depending bracket 105ᵃ fastened to box 97ᵇ and are connected by wires 111, 112 to an electric knife switch 115.

The operation of the device is effected by pulling down on lever arms 65, 65ᵃ, whereby to swing the upper parts 17, 17ᵃ of members 16, 16ᵃ off from the lower halves 18, 18ᵃ and thereafter placing in open recesses 23, 23 of members 16, 16ᵃ the pieces of tubing 20 to be welded together. Arms 65, 65ᵃ are then swung upward, whereby to clamp said pieces of tubing 20 in place. The operator then grasps handle 102 of lever 94 and handle 98. At the same time that he moves lever 94 inward to push member 16 towards its counter member 16ᵃ he will also press handle 98 towards lever 94 and, thereby close the electric circuit. Immediately the ends of tubing 20 come together the electric current will weld them together. Members 16, 16ᵃ can be turned at any angle within ninety degrees to vary the angle at which tubes 20 are welded together.

The wiring system embodies a cable 110 containing two electrical conducting wires 111 and 112 which connect terminals 113 and 114 of switch 95 with said knife switch 115. Wire 120 unites knife switch 115 with wire 122 and wire 123 unites switch 115 with switch 124 which operates automatically in a well known manner to closed position when the operator grasps handle 102 of lever 94 and handle 98 and, thereby, draws the free end of handle 98 towards handle 102. This latter movement of handle 98 will close switch 95, as heretofore described. The circuit will remain closed, whereby to effect an electric weld as long as handle 98 is in this last mentioned position and while lever 94 is actuated to push tube holding member 16 towards member 16ᵃ to bring the end of one tube 20 into contact with the other tube 20, to effect the weld. Immediately the operator releases handle 98, switches 95 and 124 will return to open position under spring tension as heretofore described. When stopping the machine for any considerable time the operator will open switch 115 by turning handle 150 as a matter of safety. Wire 122 and wire 125 connect switch 124 with the source of electrical supply, whereas wire 130 connects switch 124 with coil 131 of transformer 132 and wire 133 connects switch 124 with terminal 134 on rheostat 135. Rheostat 135 has terminals 136 mounted on board 137 made of hardened rubber or other nonelectrical conductor material and is fastened to plate 138. Wires 139 connect the terminals 136 of rheostat 135 to coil 131 at different locations. By moving arm 145 into contact with the different terminals 136 the voltage can be increased or decreased as desired.

Having thus described my invention, what I claim as new, and desire to secure by Letters Patent is as follows:

1. In a welding machine, members for holding a tubing, each of said members having a part hinged thereto, levers for actuating said parts on their hinges, whereby to allow for placing tubing therein, universal joints connecting said levers to said parts, means for moving one of said members relative to the other, whereby to bring the ends of the tubing together, means for turning said members relative to each other, whereby to hold the tubing at a predetermined angle and electrical means for welding said ends of the tubing together.

2. In a welding machine, rotatable members having parts hinged together for holding tubes, means for rocking said parts relative to each other to allow for the disposition of tubes therebetween, one of said rotatable members slidingly mounted relative to the other, a lever for moving said rotatable member relative to the rotatable member, whereby to bring the ends of the tubes together, and electric means for welding said ends when brought together.

3. In a welding machine, members for holding tubes, shafts for pivotally mounting said members, means for moving said members relative to each other, whereby to bring the tubing to be welded together, electric means for welding said ends, and threaded shafts for turning said tube holding members relative to each other to determine the angle at which said tubes shall be welded.

In testimony whereof I have affixed my signature.

HERBERT S. POWELL.